United States Patent [19]

Dakin et al.

[11] Patent Number: 4,904,864

[45] Date of Patent: Feb. 27, 1990

[54] MULTI-WAVELENGTH TIME DOMAIN REFLECTOMETER

[75] Inventors: John P. Dakin, Hampshire; David J. Pratt, Suffolk, both of England

[73] Assignee: Plessey Overseas Limited, Ilford, England

[21] Appl. No.: 131,166

[22] Filed: Dec. 10, 1987

[30] Foreign Application Priority Data

Dec. 10, 1986 [GB] United Kingdom ............... 8629545

[51] Int. Cl.$^4$ .............................................. H01J 5/16
[52] U.S. Cl. ..................................... 250/227; 250/226
[58] Field of Search ............... 250/227, 231 R, 231 P, 250/226; 356/73.1

[56] References Cited

U.S. PATENT DOCUMENTS 4,356,396 10/1982 Ruell et al. ......................... 250/227
4,477,725 10/1984 Asawa et al. ................... 250/231 R
4,523,092 6/1985 Nelson ................................. 250/227
4,703,175 10/1987 Salour et al. .................... 250/231 R Primary Examiner—David C. Nelms
Attorney, Agent, or Firm—Fleit, Jacobson, Cohn, Price, Holman & Stern

[57] ABSTRACT

An optical time domain reflectometry system in which laser level reference signals are derived from the respective laser outputs from the laser sources and fed into a single receiver provided for receiving the back-scattered or returned light along an optical fibre. The receiver is thus continuously calibrated in accordance with the relative intensities of the optical signals at different frequencies being launched into the optical fibre so that the receiver provides an accurate measurement of temperature or other parameter being measured by the system.

7 Claims, 2 Drawing Sheets

MULTI-WAVELENGTH TIME DOMAIN REFLECTOMETER

BACKGROUND OF THE INVENTION

This invention relates to optical sensing systems and relates more specifically to so-called optical time domain reflectometry or similar sensing systems in which wavelength referencing techniques are employed whereby light pulses of different wavelengths derived from respective laser sources are launched into optical fiber means and in which the levels of back-scattered light or returned light at different wavelengths arriving back at the launch end of the optical fiber means with respect to time are detected by receiver means which provides an indication of the parameter (eg. temperature or pressure) being measured. The subject matter of the present application is related to the disclosure in copending application Ser. Nos. 131,167 and 131,168, both filed Dec. 10, 1987, and owned in common with the present application.

With optical sensing systems as described above, variations in the relative levels or intensities of the light pulses at different wavelengths produced by the respective laser sources can give rise to inaccuracies in the measurements provided by the receiver means.

SUMMARY OF THE INVENTION

The present invention is directed therefore to the avoidance of such measurement inaccuracies by deriving or extracting laser level reference signals directly from the respective laser outputs and feeding the laser level reference signals into a single receiver or respective receivers, as the case may be, provided for receiving the back-scattered or returned light along the optical fiber means. In this way the receiver means is continuously calibrated in accordance with the relative intensities of the optical signals at different frequencies being launched into the optical fiber means so that the receiver means provides an accurate measurement of temperature or other parameter being measured by the system.

The present invention may be applied to optical time domain reflectometry sensing systems having various forms of sensors according to the particular measurements to be made. For example, the respective laser source pulse outputs may be fed into an optical wavelength-division-multiplexer or coupler which launches the combined outputs from the laser sources into an optical fiber sensor for sensing the temperature profile along its length.

The time-related variations in the intensity of the total back-scattered light including light at the Raman wavelengths (ie. Stokes and Anti-Stokes wavelengths) returning back along the optical fiber sensor to the launch end thereof will be dependent upon the temperature at distributed points along the length of the optical fiber sensor. The intensities of light at the Raman wavelengths will vary more consistently with temperature and consequently it will be arranged that the multiplexer or coupler directs all of the returning back-scattered light into filter means which serves to filter out all wavelengths of the back-scattered light except the Raman wavelengths which are then fed to the receiver means calibrated continuously in accordance with the present invention by the feedback laser intensity reference signals applied to it.

Alternatively, an optical fiber sensor may be doped with material which absorbs light in dependence upon temperature or fluorescent material may be embodied in the sensor which fluoresces as the light pulses from the laser sources are transmitted down the sensor fiber. Thus, the intensity of the back-scattered light at the different wavelengths or of the fluorescent light returning along the sensor fiber to the launch end thereof provides an indication of the temperature profile along the fiber which will be indicated by the continuously calibrated receiver means.

In the foregoing embodiment the filter means for providing light at the Raman wavelengths only will be dispensed with since the calibrated receiver means will compare the intensities of the return signals at the different wavelengths in order to derive the temperature profile of the sensor.

In yet other embodiments of the present invention the sensor may comprise a measurand-dependent reflector or measuranddependent light absorber with associated reflector, or still further the sensor may be a chemical sensor arranged to respond to the spectophotometric properties of the reactive constituents of a reaction or a chemical material which interacts chemically with reactants to be monitored. In such embodiments, the optical fiber means of the invention will convey the light pulses of different wavelengths derived from the laser sources to the particular sensor or sensors concerned. For example, the system may comprise a plurality of sensors which are connected to laser pulse output coupling means by individual optical fibers of different lengths in order to provide the requisite time displacement between reflected light signals from the respective sensors.

The laser level reference signals may be derived from various points in the system and they may be obtained either by the reflection of a small proportion of the light produced by the lasers back along the usual return optical fiber to the receiver means or a small proportion of the light outputs from the lasers may be conveyed to the receiver means by feedback optical fiber loops. In the case of the above-described embodiment in which the laser outputs are fed into a wavelength-division-multiplexer or coupler the feedback loops may be arranged so that the laser output reference signals are obtained from the multiplexer or coupler itself or from the output optical fiber on the input or output sides of this coupler or from any optical connection or splices close to the launch end of the system.

With a view to positively preventing the feedback reference signals from being confused with back reflections, such as from the multiplexer or coupler, optical fiber delay loops may advantageously be provided either in the measurement or feedback paths in order to provide suitable time displacement between the signals concerned.

BRIEF DESCRIPTION OF DRAWING FIGURES

By way of example the present invention will now be described with reference to the accompanying drawings in which.

Figure 1:
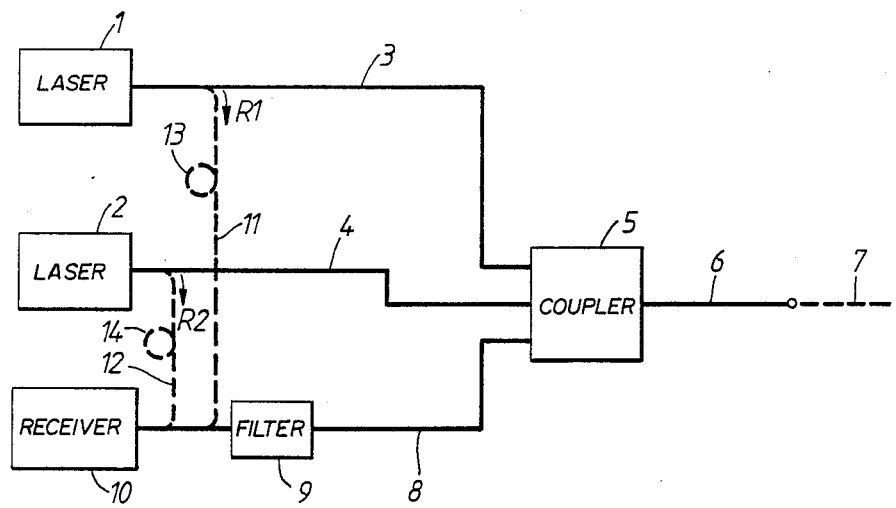
FIG. 1 shows a block-schematic diagram of one optical temperature sensing system according to the present invention.

Referring to FIG. 1 of the drawings, the temperature distribution measuring system illustrated comprises two pulse laser sources 1 and 2 for producing light pulses at different wavelengths. These light pulses are launched into respective output optical fibers 3 and 4 which convey the light pulses to a wavelength-division-multiplexer or coupler 5. The combined light pulse output from the coupler 5 is then launched into an optical fiber 6 which is coupled to a relatively long optical fiber sensor 7 which in operation of the system will be arranged to extend over the particular path for which the temperature profile or distribution is required to be measured.

In operation of the temperature sensing system a variable small proportion of the light pulses propagating along the temperature sensor 7 will be returned along the fiber as back-scattered light dependant upon the distribution of temperature along the sensor fiber 7. This back-scattered light, which is time-related, will travel back to the coupler 5 where it is directed into an optical fiber 8 and optional filter means 9. It may here be mentioned at this juncture that the back-scattered light may include light at the Raman wavelengths (ie. Stokes and Anti-Stokes wavelengths) and it is light at these wavelengths which varies most consistently with temperature changes in the sensor fiber and can therefore be utilised to provide temperature measurements at points along the temperature sensor 7 by comparing the relative intensities of back-scattered light at these wavelengths.

The frequencies of the laser source pulse outputs may be expressed as fo+fr and fo−fr where fr is the Raman frequency shift from a frequency fo which will be the center frequency of the filter means 9 which accordingly filters out all of the wavelengths of back-scattered light except the Raman wavelengths which are fed into a receiver 10. This receiver 10 measures the intensities of the received light at the Raman wavelengths with respect to time and accordingly includes a detector for such purposes to determine the temperature profile along the sensor fiber 7.

As will be appreciated, variations in the relative intensities of the laser source pulse outputs will give rise to inaccuracies in the measured intensities of light at the Raman wavelengths. In order to overcome this problem, the present invention provides for the continuous calibration of the receiver 10 by means of reference signals R1 and R2, which are derived directly from the laser outputs and which may be fed to the receiver 10 over feedback loops 11 and 12. As previously mentioned these reference signals could alternatively be derived from the coupler 5 or from other reflective points in the system prior to the sensor fiber 7. The feedback loops may include delay loops 13 and 14 so as to avoid possible confusion between the reference signals and other signals reflected to the receiver 10 from the coupler 5.

Although in the embodiment described and shown in FIG. 1 a single receiver is shown, in other embodiments two separate receivers may be employed in conjunction with a single laser source for receiving back-scattered light at different scattered wavelengths from this source.

Figure 2:
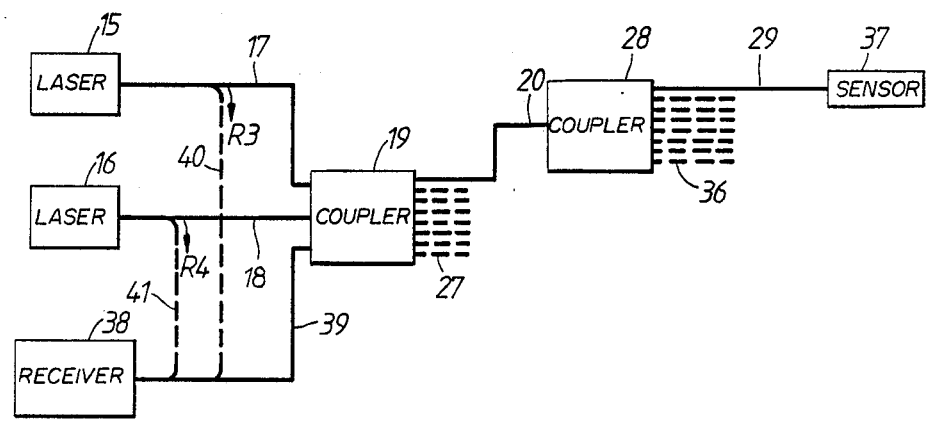
FIG. 2 shows an alternative optical temperature sensing system according to the invention; and, FIG. 3 graphically shows the reflectivity of an optical sensor in the sensing system of FIG. 2 as a function of wavelength.

Referring now to FIG. 2 of the accompanying drawings this shows a multiplexed optical sensing system utilising signals of different wavelengths for loss compensation by means of wavelength referencing.

Referring to the drawing, two laser sources indicated at 15 and 16 produce pulse signals simultaneously at different wavelengths. These signals are conveyed by optical fibers 17 and 18 to a multiplexer or coupler 19 which combines the signals and then feeds signals of reduced but equal intensity and wavelength into a plurality of optical fibers 20–27. As is fully described in our previously referred to co-pending application Ser. No. 136,167, these optical fibers 20–17 will be of different lengths so that there will be a time displacement between light signals returning from the far end of the optical fibers at which further couplers or optical sensors may be located, the sensors serving for sensing temperature, pressure or any other condition to be sensed at the locations concerned and the further couplers such as the coupler 28 serving to divide the optical signals received over the optical fiber (eg. optical fiber 20) into further reduced signals of equal magnitude and wavelength for transmission down another group of optical fibers 29–36 of different lengths, these optical fibers being terminated by optical sensors such as the sensor 37.

The sensors terminating the discrete optical fibers of different lengths may themselves comprise optical fiber sensors which may, for example, be suitably doped with light absorbant or fluorescent material whereby the level of time-displaced back-scattered light or the level of time-displaced fluorescent light emitted by the optical fiber sensors and then returned back down the fiber will be measured by a receiver 38 which accordingly includes wavelength separating means and detecting means for performing the level measurement functions with respect to returned optical signals at different wavelengths.

Figure 3:
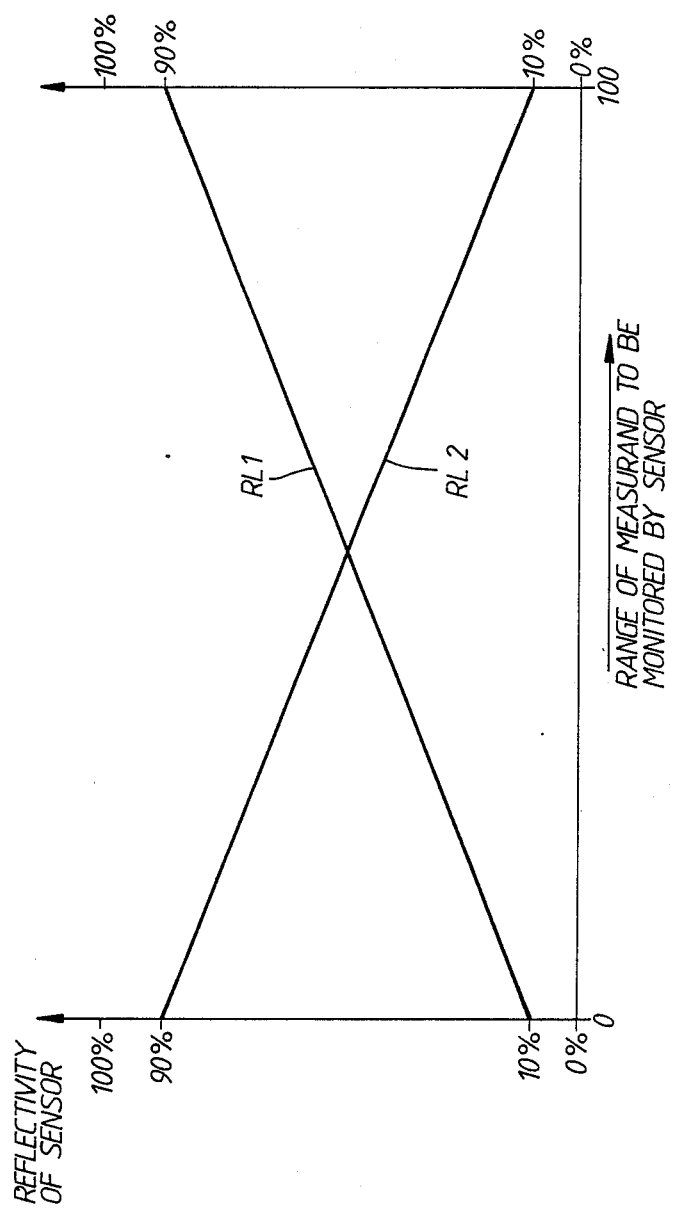

The typical reflectivity of fiber sensor 37 as a function of wavelenght of light propagating therealong is depicted in FIG. 3. As will be seen, this ranges from 10% at the lower end of the range of measurand 90% at the upper end of the range of measurand for the wavelength RL1 and from 90% at the lower end of the range of measurand to 10% at the upper end of the range of measurand for the other wavelength RL2. At the center of the range of the measurand the reflectivity of the sensor is about 50%.

The sensors could take many other forms. For example, they could comprise measurand-dependant reflectors or measurand-dependant absorbers with associated reflectors or they could be chemical sensors arranged to respond to the spectophotometric properties of the reactive constituents of a reaction or of chemical material which interacts chemically with reactants to be monitored.

In operation of the sensing system the light of two different wavelengths returning back down the optical fibers 29–36 from the optical sensors terminating the fibers will be combined and directed by the coupler 28 into the optical fiber 20 connecting the coupler 28 to the coupler 19. The light returning back along the optical fibers 21–27 from the optical sensors terminating these fibers together with the light propagating in the optical fiber 20 will be combined by the coupler 19 and then directed to an optical time domain reflectometer receiver 38 over an optical fiber 39.

The multiplexed return signal of one wavelength is utilised by the reflectometer receiver 38 to define an intensity reference for the signals at the other wavelength in order to enable the receiver 38 to provide an indication of the measurements at the multiple locations of the optical sensors (eg. the reflective sensors).

In accordance with the present invention, however, compensation for variations in the relative intensities of the optical signals generated by the lasers 15 and 16 which can cause the receiver 38 to give inaccurate measurement indications is provided by tapping off a small proportion of the light signals produced by the lasers as reference signals R3 and R4 and feeding these signals over feedback paths 40 and 41 to the receiver 38. These reference signals which may alternatively be derived from the coupler 19, for example, serve for calibrating the receiver 38 continuously so that the receiver takes the source intensity changes into account when providing parameter indications.

As in the FIG. 1 embodiment time delay loops (not shown) may be provided in the feedback paths 40 and 41 for the reference signals in order positively to avoid confusion between these reference signals and reflected signals from the coupler 19.

We claim:

1. In an optical sensing system, in which optical pulse outputs of different wavelengths are launched at a launch end into optical fiber means through which returned optical signals are conducted for respective detection at the different wavelengths at the launch end with respect to time by one receiver indicating intensity levels of said returned optical signals corresponding to a parameter being measured, a method of continuously calibrating the receiver, including the steps of: extracting level reference signals directly from the respective optical pulse outputs at the different wavelengths; and feeding back into the receiver said level reference signals varying in accordance with the relative intensity levels of the optical pulse outputs at the different wavelengths being launched into the optical fiber means so that the receiver provides an accurate indication of the parameter being measured.

2. The method as claimed in claim 1, in which optical time domain reflectometry techniques are used for determining the parameter.

3. The method as claimed in claim 2, in which the respective optical pulse outputs are combined and the combined outputs are launched into an optical fiber sensor after extraction of the level reference signals therefrom for sensing a temperature profile as the parameter being measured.

4. The method as claimed in claim 3, in which all of the combined outputs are returned from the optical fiber sensor as return signals; filtering out all wavelengths of the return signals except the Roman wavelengths; and feeding the filtered return signals to the receiver being continuously calibrated by the feedback of the level reference signals.

5. The method as claimed in claim 1, in which the optical fiber means includes an optical temperature responsive fiber sensor which is doped with material which absorbs light in dependence upon temperature.

6. The method as claimed in claim 1, in which a chemical sensor which responds to the spectrophotometric properties of chemical material interacts chemically with reactants to measure the parameter.

7. The method as claimed in claim 1, in which optical transmission of the level reference signals to the receiver are delayed to avoid confusion between the level reference signals and other signals returned to the receiver.

* * * * *